(12) United States Patent
Bartley et al.

(10) Patent No.: US 7,810,065 B2
(45) Date of Patent: Oct. 5, 2010

(54) SYSTEM AND METHOD FOR IMPLEMENTING OPTIMIZED CREATION OF OPENINGS FOR DE-GASSING IN AN ELECTRONIC PACKAGE

(75) Inventors: Gerald K. Bartley, Rochester, MN (US); Darryl J. Becker, Rochester, MN (US); Paul E. Dahlen, Rochester, MN (US); Philip R. Germann, Oronoco, MN (US); Andrew B. Maki, Rochester, MN (US); Mark O. Maxson, Mantorville, MN (US); Trevor J. Timpane, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 500 days.

(21) Appl. No.: 11/844,861

(22) Filed: Aug. 24, 2007

(65) Prior Publication Data
US 2009/0055134 A1 Feb. 26, 2009

(51) Int. Cl.
*G06F 17/50* (2006.01)

(52) U.S. Cl. ............................. 716/19; 716/11; 716/18

(58) Field of Classification Search .................... 716/11, 716/18, 19
See application file for complete search history.

(56) References Cited

U.S. PATENT DOCUMENTS 7,556,086 B2 * 7/2009 Joshi et al. ................. 165/80.3

* cited by examiner

*Primary Examiner*—Thuan Do
(74) *Attorney, Agent, or Firm*—Dillon & Yudell LLP

(57) ABSTRACT

System and method for designing an electronic package. A placement manager receives a physical design of an electronic package from a packaging design tool. The placement manager receives design constraints regarding the physical design for the electronic package. The placement manager inserts specifications for at least one de-gassing opening in the physical design for the electronic package, wherein the specification for at least one de-gassing opening are created in accordance with said design constraints regarding said physical design of said electronic package. The placement manager outputs an updated physical design of the electronic package.

12 Claims, 5 Drawing Sheets

SYSTEM AND METHOD FOR IMPLEMENTING OPTIMIZED CREATION OF OPENINGS FOR DE-GASSING IN AN ELECTRONIC PACKAGE

BACKGROUND OF THE INVENTION

1. Technical Field

The present invention relates in general to the field of data processing systems, and in particular, the present invention relates to the field of data processing system design. Still more particularly, the present invention relates to optimizing the design of data processing system components.

2. Description of the Related Art

Electronic packages, and more specifically, build-up laminate electronic packages, require openings in the solid copper planes to allow for escape of gasses during high temperature processing. If the openings are not provided, the package could possibly delaminate if moisture becomes trapped inside the carrier material.

SUMMARY OF THE INVENTION

The present invention includes a system and method for designing an electronic package. A placement manager receives a physical design of an electronic package from a packaging design tool. The placement manager receives design constraints regarding the physical design for the electronic package. The placement manager inserts specifications for at least one de-gassing opening in the physical design for the electronic package, wherein the specification for at least one de-gassing opening are created in accordance with said design constraints regarding said physical design of said electronic package. The placement manager outputs an updated physical design of the electronic package.

The above, as well as additional purposes, features, and advantages of the present invention will become apparent in the following detailed written description.

BRIEF DESCRIPTION OF THE FIGURES

The novel features believed characteristic of the invention are set forth in the appended claims. The invention itself, as well as a preferred mode of use, further purposes and advantages thereof, will best be understood by reference to the following detailed description of an illustrative embodiment when read in conjunction with the accompanying figures, wherein:

DETAILED DESCRIPTION OF AN EMBODIMENT

The present invention relates to a system and a computer-implementable method for creating or modifying the placement, size, and shape of openings needed for de-gassing structures in laminate electronic packages by evaluating an existing design. According to an embodiment of the present invention, a placement manager creates or modifies the placement, size, and shape of openings by taking into account a collection of factors, which include, but are not limited to, the placement of existing wiring structures on adjacent planes, the locations of vias and other openings on adjacent places, and the amount of copper balancing desired for a particular plane.

Figure 1:
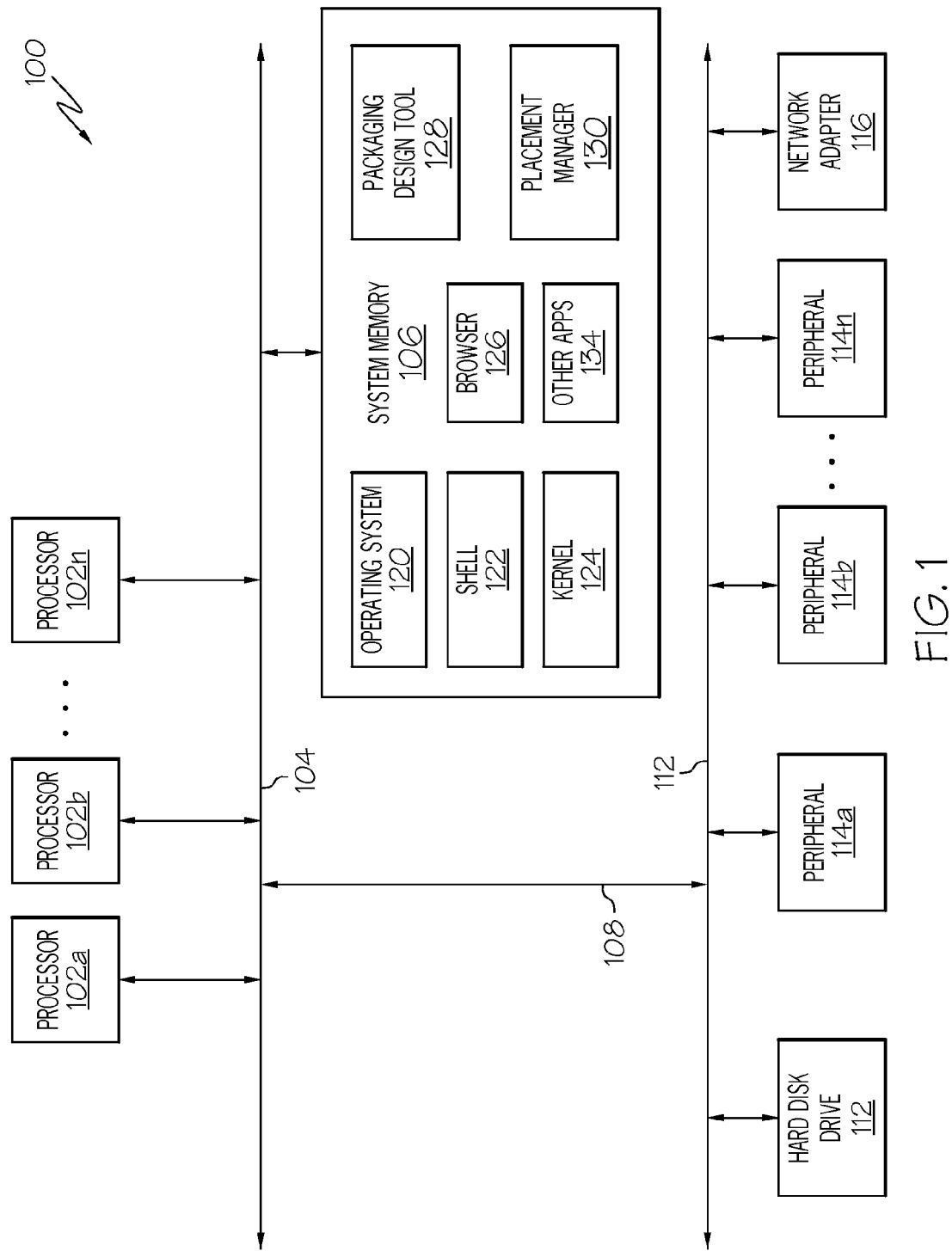
FIG. 1 is a block diagram illustrating an exemplary data processing system in which an embodiment of the present invention may be implemented.

Referring now to the figures, and in particular, referring now to FIG. 1, there is illustrated an exemplary data processing system 100 in which an embodiment of the present invention may be implemented. As shown, exemplary data processing system 100 includes a collection of processors 102a-102n that are coupled to a system memory 106 via system bus 104. System memory 106 may be implemented by dynamic random access memory (DRAM) modules or any other type of random access memory (RAM) module. Mezzanine bus 108 couples system bus 104 to peripheral bus 110. Coupled to peripheral bus 110 is a hard disk drive 112 for mass storage and a collection of peripherals 114a-114n, which may include, but are not limited to optical drives, other hard disk drives, printers, input devices, and the like. Also coupled to peripheral bus 110 is a network adapter 116, which enables data processing system 100 to communicate with a network (e.g., the Internet, a LAN, a WAN, and the like).

Also, as depicted, system memory 106 includes an operating system 120, which further includes a shell 122 (as it is called in UNIX®) for providing transparent user access to resources such as browser 126 (utilized for access to Internet 104) and other applications 134. Other applications 134 may include word processors, spreadsheets, databases, and the like. Generally, shell 122, also called command processors in MICROSOFT WINDOWS®, is generally the highest level of the operating system software hierarchy and serves as a command interpreter. Shell 122 provide system prompts, interpret commands entered by keyboard, mouse, or other user input media, and sends the interpreted command(s) to the appropriate lower levels of the operating system (e.g., kernel 124) for processing. Note that while shell 122 is a text-based, line-oriented user interface, the present invention will support other user interface modes, such as graphical, voice, gestural, etc. equally well.

As illustrated, operating system 120 also includes kernel 124, which further includes lower levels of functionality for operating system 120, browser 126, and other applications 134, including memory management, process and task management, disk management, and mouse and keyboard management.

System memory 106 also includes packaging design tool 128, which enables a circuit designer to design the electronic package (which may be implemented by, but not limited to ALLEGRO PACKAGE DESIGNER® by CADENCE®), and a placement manager 130, which performs the optimization of creating de-gassing openings in an electronic package in accordance with an embodiment of the present invention. A package design tool is utilized to place all of the physical structures of an electronic package including interconnect wires or traces, power supply shapes and planes, and pads for soldering interconnects of the next level of packaging. As well-known to those with skill in the art, an electronic package includes multiple layers of interconnect structures that are vertically connected via structures. The package design tool is utilized to construct all of these structures in an electronic format that can be utilized to manufacture an actual, physical package.

Those with skill in the art will appreciate that data processing system 100 can include may additional components not specifically illustrated in FIG. 1. Because such additional components are not necessary for an understanding of the present invention, they are not illustrated in FIG. 1 or discussed further herein. It should be understood that the enhancements to data processing system 100 provided by the present invention are applicable to data processing systems of any system architecture and are in no way limited to the generalized multi-processor architecture depicted in FIG. 1.

Figure 2A:
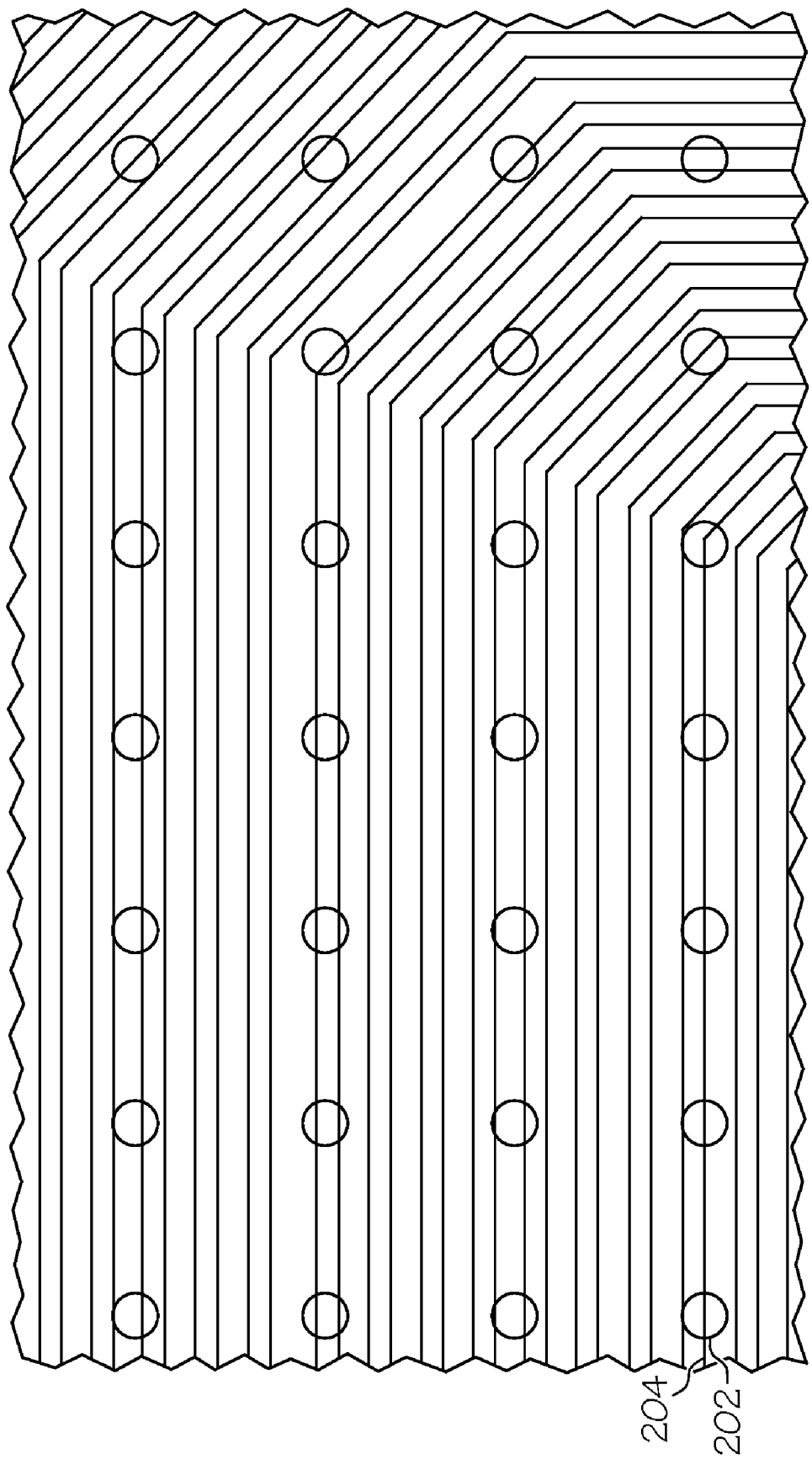
FIG. 2A is a diagram depicting the placement of de-gassing openings in an electronic package according to the prior art.
Figure 2B:
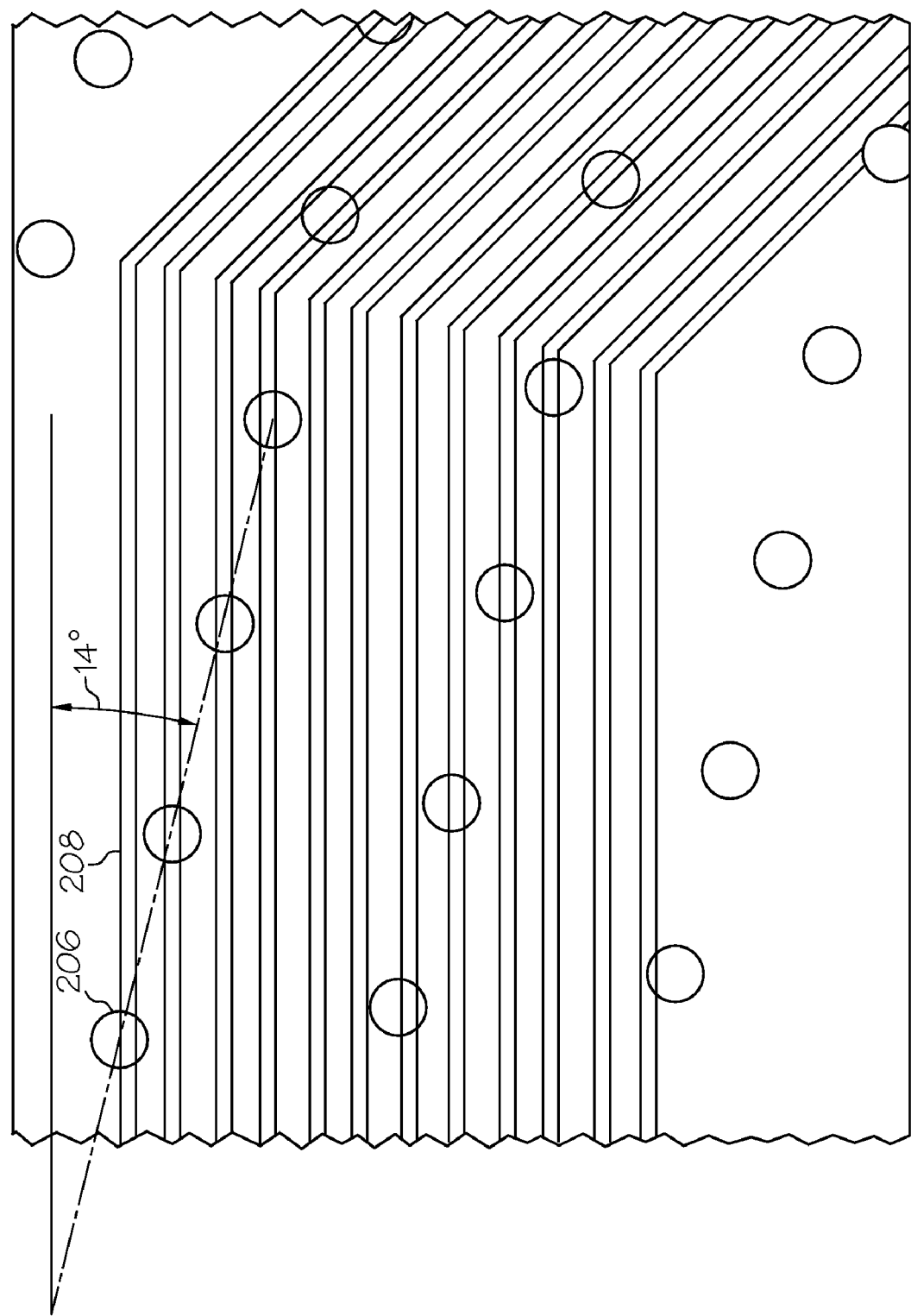
FIG. 2B is a diagram showing the placement of de-gassing openings in an electronic package according to the prior art.

FIG. 2A is a pictorial illustration of placing de-gassing openings (e.g., de-gassing opening 202) on a regular x-y grid on a power layer of an electronic package while an adjacent signal layer has high-speed signals (e.g., signal 204) routed at angles of 90 and 45 degrees in accordance with the prior art. FIG. 2B is a pictorial depiction of placing de-gassing openings (e.g., de-gassing opening 206) at an angle that differs from the angle of signal routing (e.g., signal 208) on the adjacent layer in accordance with the prior art. According to FIG. 2B, the de-gassing openings are organized in a regular x-y grid, but are rotated to an angle (e.g., 14° degrees) that differs from the angle of signal routing on an adjacent layer.

Figure 2C:
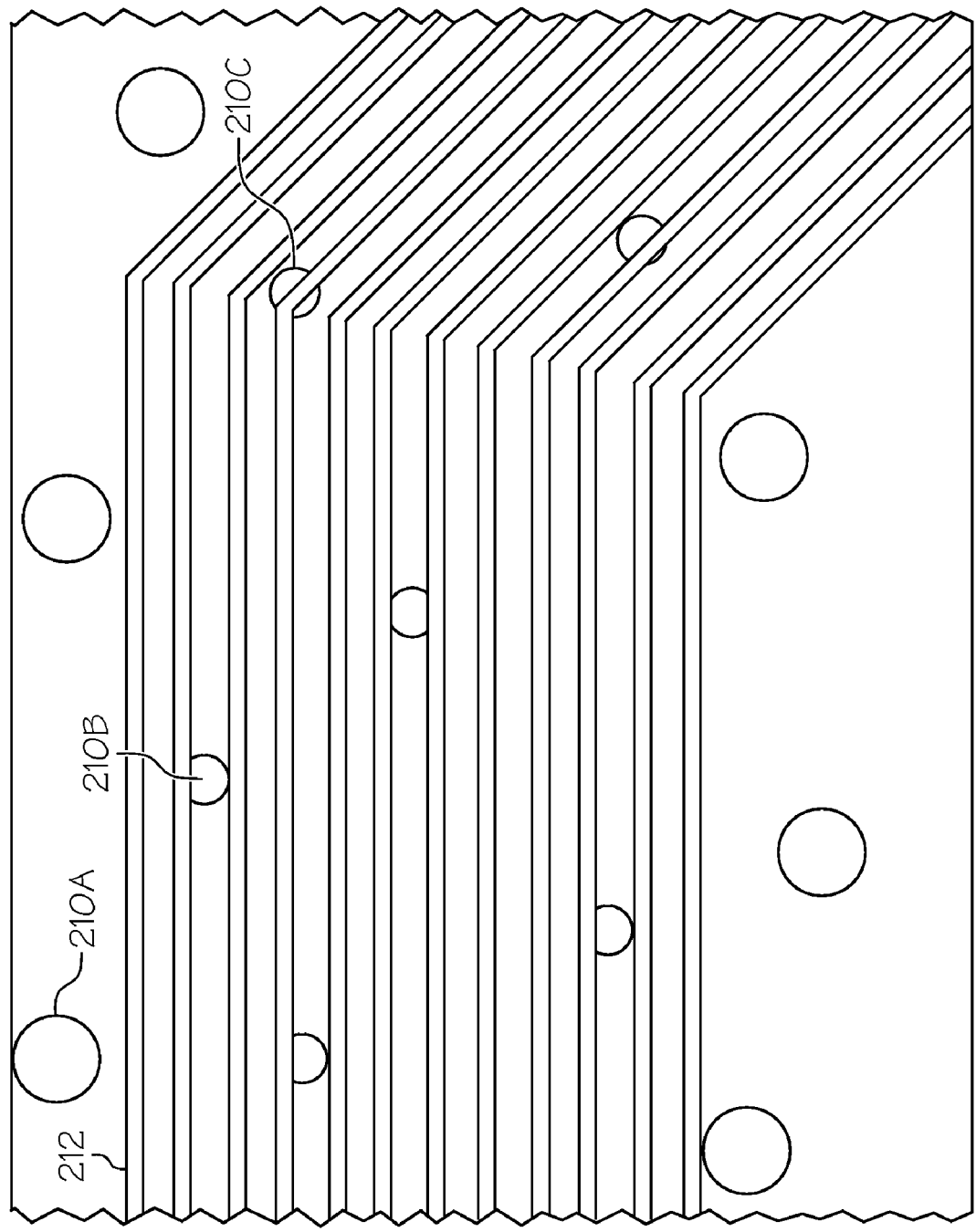
FIG. 2C is a diagram illustrating the placement of de-gassing openings in an electronic package according to an embodiment of the present invention.

FIG. 2C is a pictorial illustration that shows a possible result of the output of placement manager 130 where the area beneath the critical signals (e.g., signal 212) might have smaller openings (e.g., de-gassing opening 210b) while the area outside the signals may have larger openings (e.g., de-gassing opening 210a). As depicted, the area beneath the signals has a lesser number of de-gassing openings than the area outside of the signals. Also, there is not more than one opening (e.g., de-gassing opening 210c) next to any one signal.

Figure 3:
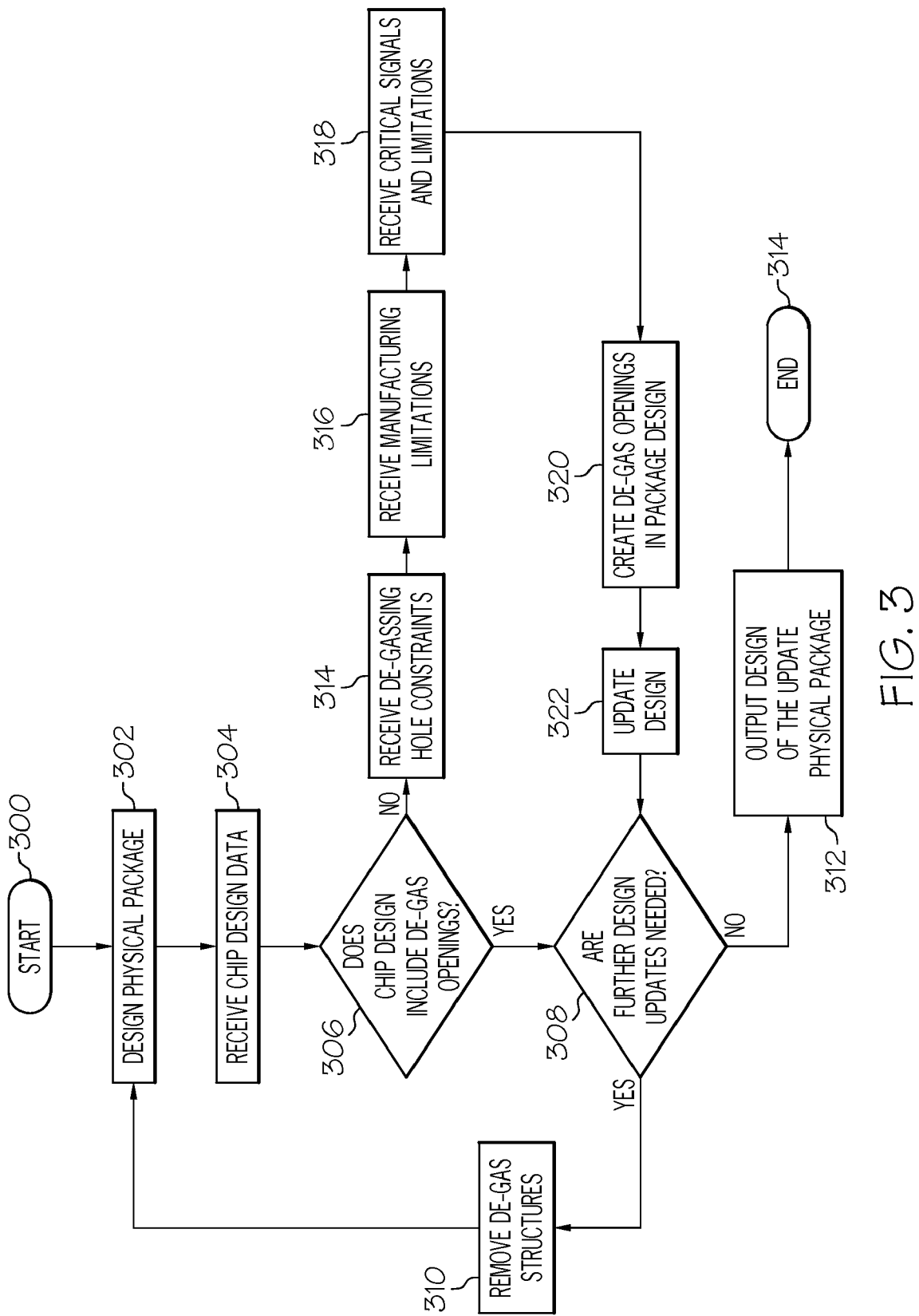
FIG. 3 is a high-level logical flowchart diagram illustrating an exemplary method for implementing optimized creation of openings for de-gassing in an electronic package according to an embodiment of the present invention.

FIG. 3 is a high-level logical flowchart showing an exemplary for implementing optimized creation of openings for de-gassing in an electronic package according to an embodiment of the present invention. The process begins at step 300 and continues to step 302, which illustrates a user designing the physical package design for an electronic package utilizing packaging design tool 128. The process continues to step 304, which depicts packaging design tool 128 sending the chip design data for the electronic package to placement manager 130. The process proceeds to step 306, which shows placement manager 130 determining if the chip design data includes de-gas openings.

If the chip design data does not include de-gas openings, the process continues to steps 314, 316, and 318, which illustrate placement manager 130 receiving guidelines from packaging design tool 128 regarding de-gassing opening size constraints, manufacturing limitations, and critical signals and limitations, as discussed in conjunction with FIG. 2C. Some of the guidelines received from packaging design tool 128 include, but not limited to, a percent coverage of plane openings per unit length for each trace, which may vary depending on some of the electrical criteria for each net. Other guidelines may include a consideration of the location of high-speed signals, since high-speed signals may require more solid planes above and below the high-speed signals than other, less critical signals. Both planes above and below each trace would need to be considered in calculating the coverage. Minimum de-gassing opening requirements would need to be included based on the manufacturing requirements of each package supplier. For example, the guidelines received from packaging design tool 128 dictate that more de-gassing openings may be placed in certain areas of the physical package design because critical/high-speed signals are located in other areas of the physical package design, placement manager 130 will concentrate the placement of de-gassing openings in those certain areas.

The process proceeds to step 320, which shows placement manager 130 creating specifications for de-gas openings in the package physical design in accordance with the guidelines received from packaging design tool 128 An example of de-gassing opening placement according to an embodiment of the present invention is illustrated in FIG. 2C, where the area beneath the critical signals (e.g., signal 212) might have smaller openings (e.g., de-gassing opening 210b) while the area outside the signals may have larger openings (e.g., de-gassing opening 210a). As depicted, the area beneath the signals has a lesser number of de-gassing openings than the area outside of the signals. Also, there is not more than one opening (e.g., de-gassing opening 210c) next to any one signal. The process continues to step 322, which illustrates placement manager 130 sending the package physical design to package design tool 128 and updating the package design. The process returns to step 308.

Returning to step 306, if placement manager 130 determines that the design data includes de-gas openings, the process continues to step 308, which shows placement manager 130 determining if any further designs updates are needed. If not, the process continues to step 312, which illustrates package design tool 128 outputting the package design via a display, network adapter 116, and/or saving the package design to hard disk drive 112 or some other type of removable or non-removable storage. If further designs are needed, the process continues to step 310, which shows placement manager 130 removing de-gas structures from the design data. The process returns to step 302.

As discussed, the present invention includes a system and method for designing an electronic package. A placement manager receives a physical design of an electronic package from a packaging design tool. The placement manager receives design constraints regarding the physical design for the electronic package. The placement manager inserts specifications for at least one de-gassing opening in the physical design for the electronic package, wherein the specification for at least one de-gassing opening are created in accordance with said design constraints regarding said physical design of said electronic package. The placement manager outputs an updated physical design of the electronic package.

It should be understood that at least some aspects of the present invention may alternatively be implemented in a computer-usable medium that contains a program product. Programs defining functions in the present invention can be delivered to a data storage system or a computer system via a variety of signal-bearing media, which include, without limitation, non-writable storage media (e.g., CD-ROM), writable storage media (e.g., hard disk drive, read/write CD-ROM, optical media), system memory such as, but not limited to random access memory (RAM), and communication media, such as computer networks and telephone networks, including Ethernet, the Internet, wireless networks, and like networks. It should be understood, therefore, that such signal-bearing media, when carrying or encoding computer-readable instructions that direct method functions in the present invention, represent alternative embodiments of the present invention. Further, it is understood that the present invention may be implemented by a system having means in the form of hardware, software, or a combination of software and hardware as described herein or their equivalent.

While the present invention has been particularly shown and described with reference to a preferred embodiment, it will be understood by those skilled in the art that various changes in form and detail may be made herein without departing from the spirit and scope of the invention.

What is claimed is:

1. A method for designing an electronic package, said method comprising:

receiving design data of an electronic package from a packaging design tool within a data processing system;

in response to said electronic package does not include any de-gassing openings according to said design data, inserting specifications for a plurality of de-gassing openings in said design data for said electronic package, wherein said specifications for said plurality of de-gassing openings are generated in accordance with de-gassing openings size constraints and electronic package manufacturing limitations regarding said electronic package; and updating said design data of said electronic package within said data processing system by utilizing said de-gassing openings specifications.

2. The method of claim 1, wherein the sizes of said de-gassing openings are not uniform.

3. The method of claim 1, wherein each signal line is associated with only one de-gassing opening.

4. The method of claim 1, wherein an area beneath a signal line has lesser number of de-gassing openings than an area not beneath a signal line.

5. A computer-usable medium having a computer program product for designing an electronic package, said computer-usable medium comprising:

computer program code for receiving design data of an electronic package from a packaging design tool within a data processing system;

computer program code for, in response to said electronic package does not include any de-gassing openings according to said design data, inserting specifications for a plurality of de-gassing openings in said design data for said electronic package, wherein said specifications for said plurality of de-gassing openings are generated in accordance with de-gassing openings size constraints and electronic package manufacturing limitations regarding said electronic package; and computer program code for updating said design data of said electronic package within said data processing system by utilizing said de-gassing openings specifications.

6. The computer-usable medium of claim 5, wherein the sizes of said de-gassing openings are not uniform.

7. The computer-usable medium of claim 5, wherein each signal line is associated with only one de-gassing opening.

8. The computer-usable medium of claim 5, wherein an area beneath a signal line has lesser number of de-gassing openings than an area not beneath a signal line.

9. A computer system for designing an electronic package, said computer system comprising:

means for receiving design data of an electronic package from a packaging design tool;

means for, in response to said electronic package does not include any de-gassing openings according to said design data, inserting specifications for a plurality of de-gassing openings in said design data for said electronic package, wherein said specifications for said plurality of de-gassing openings are generated in accordance with de-gassing openings size constraints and electronic package manufacturing limitations regarding said electronic package; and means for updating said design data of said electronic package by utilizing said de-gassing openings specifications.

10. The computer system of claim 9, wherein the sizes of said de-gassing openings are not uniform.

11. The computer system of claim 9, wherein each signal line is associated with only one de-gassing opening.

12. The computer system of claim 9, wherein an area beneath a signal line has lesser number of de-gassing openings than an area not beneath a signal line.

* * * * *